United States Patent

[11] 3,616,374

| [72] | Inventors | Roland Henry Goshorn<br>Fort Washington;<br>Paul Daniel Morton, Malvern, both of Pa. |
|---|---|---|
| [21] | Appl. No. | 862,159 |
| [22] | Filed | Sept. 24, 1969 |
| [45] | Patented | Oct. 26, 1971 |
| [73] | Assignee | Pennwalt Corporation<br>Philadelphia, Pa. |

[54] d-LIMONENE DIMERCAPTAN PROCESS
2 Claims, No Drawings

| [52] | U.S. Cl. | 204/162 R |
|---|---|---|
| [51] | Int. Cl. | B01j 1/10 |
| [50] | Field of Search | 204/158 |

[56] References Cited
UNITED STATES PATENTS

| 3,045,053 | 7/1962 | Ford | 204/158 R |
|---|---|---|---|
| 3,257,302 | 6/1966 | Warner | 204/162 R |

Primary Examiner—Howard S. Williams
Attorney—Carl A. Hechmer, Jr.

ABSTRACT: A continuous process for preparing d-limonene dimercaptan by exposing a continuously flowing liquid mixture of d-limonene and hydrogen sulfide to ultraviolet light at a temperature between about 0° C. and about 25° C., at a pressure between 175 to 250 p.s.i.g., said mixture of hydrogen sulfide and d-limonene being at a mole ratio of from between about 10:1 to about 25:1.

d-LIMONENE DIMERCAPTAN PROCESS d-limonene dimercaptan is a known optically active compound also frequently named d-2,9-paramenthanedithiol or d-(α-methylβ-mercaptoethyl)-3-metcapto-4-methylcyclohexane. This dimercaptan is an intermediate to organometallic polymers useful as water repellents for textiles (See U.S. Pat. No. 3,294,761). Methods to prepare this dimercaptan compound are known as, for example, the method of Marvel and Olson (J. Polymer Science XXVI, 23–8 (1957)), which requires the addition of thiolacetic acid to d-limonene in the presence of ultraviolet light to form the dithiolacetate which is subsequently hydrolyzed to produce the mercaptan in yields of about 70 percent.

Another method of interest in the prior art is that disclosed by U.S. Pat. No. 3,257,302 where hydrogen sulfide is reacted with dipentene (optically inactive dl-limonene not d-limonene) in the presence of ultraviolet light to produce dipentene dimercaptan (optically inactive 2,9-paramenthanedithiol). In this process, however, a series of 3 reactors is required with an increase in temperature and venting of hydrogen sulfide for each successive reactor. Reaction temperatures range from 27° C. in the first reactor to temperatures as high as 121° C. in the third reactor.

Neither of the two above described processes are suitable for an economical efficient process. In the first referenced process, two steps are required and the yield is not particularly good. In the reaction of the patent, complicated three stage equipment is required to be operated at rather high temperature, and thus the procedure is extremely expensive and cumbersome.

It has now been found that optically active d-limonene dimercaptan can be prepared from d-limonene by reaction with hydrogen sulfide in the presence of ultraviolet light without using a complicated series of reaction steps, whereby a highly efficient, highly desirable and economical process is achieved. In accord with the invention, a continuous process for preparing d-limonene dimercaptan is provided by exposing a continuously flowing liquid mixture of d-limonene and hydrogen sulfide to ultraviolet light at temperatures between about 0° C. and about 25° C. at a pressure between about 175 to 250 p.s.i.g., and maintaining the mixture of hydrogen sulfide and d-limonene at a mole ratio of from between about 10:1 to about 25:1.

In the process of the invention temperatures above about 25° C. are objectionable because of the high pressure that will develop due to the large excess of hydrogen sulfide used in the process. Temperatures below about 0° C. on the other hand are undesirable because the process would then require expensive refrigeration equipment and at reduced temperatures special precautions are needed to prevent frost accumulation on the UV light transmitting surfaces of the reactor.

It is essential in the process to maintain the desired ratio of reactants in the liquid phase. To accomplish this, pressures in the range of about 175 to 250 p.s.i.g. must be used, for only under such a pressure range is practical and economical operation achieved. As indicated, the mole ratio of hydrogen sulfide to d-limonene which will be used in the process will be from about 10:1 to about 25:1. It is found that lower ratios give significantly higher amounts of undesired monomercaptan with a corresponding decrease in the production of dimercaptan. On the other hand, at ratios above this range the reactor output is reduced because of the diluting effect of the excess hydrogen sulfide.

Reaction between the hydrogen sulfide and the d-limonene under the influence of the ultraviolet light is considered to be extremely rapid in areas of high light intensity In order to make the process as efficient as possible, a large area of light permeable reactor wall exposed in the light source is desired. It is also desirable to have a high level of turbulence in the reactor when exposed to the UV light. Preferably, the reactor will be constructed in a tubular fashion of quartz or *Vycor* and such techniques for carrying out UV light catalyzed reactions are well known. In a preferred procedure, used to illustrate the invention herein, the reactor was a vertical quartz tube about 9 millimeters inside diameter encased in a quartz jacket through which a methanol-water-cooled solution was circulated. The jacket of the reactor was located in the center of an aluminum cylinder which supported four 30 w. germicidal lamps placed symmetrically around the reactor tube. It will be understood, of course, that other reactor constructions may also be employed in the process.

In the reactor just described, a reaction time of 10 to 20 minutes gave very high conversions per pass. In order to further illustrate the process of the invention the following specific example is given:

EXAMPLE I d-Limonene and hydrogen sulfide were combined in the desired proportions and passed continuously in the above described quartz reactor at about 200 p.s.i.g. pressure which was irradiated with ultraviolet light as described above.

The reactor effluent was passed through a pressure control valve where the pressure was reduced to atmospheric pressure and thence to a crude product collection flask from which hydrogen sulfide vapor was vented continuously through a short (12 inch) Vigreaux column and a Dry-Ice-Dowanol cooled condenser while the liquid product was warmed to free it from dissolved hydrogen sulfide.

Feed rates were adjusted to give a 10 to 20 minute reaction time in the illuminated zone and the temperature was maintained at about 3° to about 5° C.

The data obtained is indicated in the following table:

TABLE

| Mole ratio H₂S to d-limonene | Mercaptan sulfur value of liquid reaction product | Conv. to dimercaptan (calcd. from sulfur values) based on d-limonene fed | Conv. to distilled dimercaptan | Conv. to distilled monomercaptan |
|---|---|---|---|---|
| 6:1 | 25.12% | 73.5% | 59% | 19% |
| 10:1 | 27.99% | 87.9% | 77% | 7% |
| 22.7:1 | 29.77% | 93.7% | 82% | 3% |

The optical rotation of a sample of the distilled dimercaptan was found to be +30.2 at 22.5° C.

In order to illustrate the high specificity of this process to the reaction of H₂S with d-limonene, the following examples are given to show inoperability of the process with dl-limonene (dipentene):

EXAMPLE II

Eastman technical grade dipentene (indicated by gas-liquid chromatography to contain 81 percent dipentene) was reacted with hydrogen sulfide as described in example I. At a hydrogen sulfide to dipentene mole ratio of about 20 to 1, a conversion of only 2 to 3 percent to dimercaptan was obtained as calculated from mercaptan sulfur values, on the basis of 81 percent dipentene in the feed stock.

EXAMPLE III

Hercules' dipentene No. 122 (50–53 percent dipentene) was reacted as described in example II. In a series of runs in which the temperature was varied from −4° C. to +25° C., the maximum conversion to dimercaptan was 5.3 percent based on 50 percent dipentene in the feed stock and on mercaptan sulfur values of the liquid reaction product.

Freshly distilled Hercules' dipentene No. 122 gave essentially the same results.

In contrast, as can be seen from the data of example I, high conversions to optically active d-limonene dimercaptan are obtained when d-limonene is used.

We claim:

1. A continuous process for preparing d-limonene dimercaptan which comprises exposing a continuously flowing liquid mixture of d-limonene and hydrogen sulfide to ultraviolet light at a temperature between about 0° and about 25° C. at a pressure between about 175 and about 250 p.s.i.g., and said mixture of hydrogen sulfide and d-limonene being at a mole ratio of from between about 10:1 to about 25:1.

2. The process of claim 1 where the mole ratio of hydrogen sulfide to d-limonene is about 20:1.